United States Patent Office 3,100,197
Patented Aug. 6, 1963

3,100,197
MONOOLEFIN POLYMER STABILIZED WITH A COMBINATION OF A PHENOLIC CONDENSATE AND A PHOSPHORUS AMIDE, AND PROCESS FOR PREPARING SAME
Claus Heuck, Hofheim, Taunus, Fritz Rochlitz and Otto Mauz, Frankfurt am Main, Jakob Winter, Hofheim, Taunus, and Felix Schulde, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed Dec. 15, 1959, Ser. No. 859,558
Claims priority, application Germany Dec. 20, 1958
9 Claims. (Cl. 260—43)

Many highly polymeric compounds suffer degradation under the action of oxygen at high temperatures or the action of light. In this manner fractures in the macromolecule occur which impair the properties, such as strength, elongation and hardness, of the product. For the purpose of preventing or considerably reducing such degradation numerous improving agents are known.

Thus, for example, for improving high pressure polyethylene there may be mentioned as stabilizers phenol derivatives, such as diphenylol-propane or dicresylol propane and the corresponding methane derivatives, which are substituted in the benzene ring by alkyl groups containing 1–8 carbon atoms, and also condensation products of phenol and cyclohexanone, and finally sulphur-containing phenol derivatives such as 4:4′-thio-bis-(6-tertiary butyl-meta-cresol).

However, these compounds are capable only of stabilizing high pressure polyethylene and fail to stabilize polyolefins made by the low pressure process from olefins containing a tertiary carbon atom. The latter polyolefins can be stabilized according to one prior proposal with condensation products of nonyl-phenol and acetone, and according to another proposal, with condensation products of alkyl-phenols and chlorides of sulphur. Condensation products of alkyl-phenols and ketones or aldehydes in general can be used for stabilizing, for example, low pressure polypropylene.

For many purposes such stabilization is insufficient, especially when articles made of the polyolefins are to be subjected for prolonged periods to high temperatures, as is the case, for example, in electrical apparatus, where constant temperatures of 80° C. to 100° C. often occur.

Now we have found that an excellent stability can be imparted to olefin polymers by using, in addition to a condensation product of an alkyl phenol, especially nonyl-phenol, with a ketone or aldehyde or with a chloride of sulphur, an organic phosphorus amide as co-stabilizer.

The new phosphorus amides used as co-stabilizers have the general formula

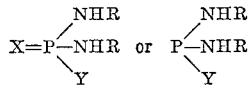

in which X represents a sulphur or oxygen atom, Y represents a group —NHR, —NR₂, —R′, —SR or —OR, R represents a hydrogen atom or a hydrocarbon radical containing 1 to 25 carbon atoms, and R′ represents a halogen atom, such as a fluorine, chlorine or bromine atom, or a hydrocarbon radical containing 1 to 25 carbon atoms. The aforesaid phosphorus amides lead to an excellent stabilizing action, but only in conjunction with the aforesaid condensation products of alkyl-phenols. Accordingly, the phosphorus amides possess a synergistic action and are therefore to be regarded as co-stabilizers.

Accordingly, this invention is concerned with a stabilizer system, in which the condensation product of an alkyl-phenol with an aldehyde, ketone or chloride of sulphur is the stabilizer and an organic phosphorus amide is the co-stabilizer.

It is not known with certainty what role the co-stabilizer plays. It is possible that the phosphorus amide combines in the same manner with certain heavy metals, especially iron, which may have entered the polyolefin during its manufacture and promotes the formation of polyolefin peroxides, which may cause some degradation to occur.

As condensation products, that constitute a part of the stabilizer system used in the invention, especially advantageous are the products described for example, in German Auslegeschrift No. 1,062,926.

Organic phosphorus amides used as the second component of the stabilizer system are essentially those which contain two primary or two secondary amide groups or one primary and one secondary amide group, that is to say, a hydrogen atom must be bound to each of at least two nitrogen atoms of the phosphorus amide molecule. For example, there may be mentioned:

(1) Phosphorus acid amides

(2) Phosphoric acid amides

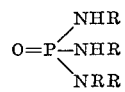

(3) Phosphoric acid ester amides

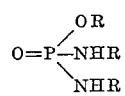

(4) Phosphonic acid amides

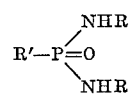

(5) Thiophosphoric acid amides

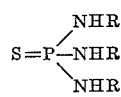

(6) Thiophosphoric acid ester amides

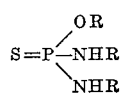

(7) Thiophosphonic acid amides

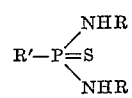

In the above formulae R may represent the following residues: alkyl containing 1–25 carbon atoms, such as methyl, ethyl, n-propyl, isopropyl, n-butyl, isobutyl, n-pentyl, isopentyl, n-hexyl, isohexyl or the like, and especially the residues octyl, dodecyl, myristyl, cetyl and octadecyl; or aryl, such as phenyl, or naphthyl; or aralkyl such as the residues composed of the aforesaid aryl and alkyl-derivatives; or cyclohexyl. Furthermore, R′ in the above formulae may represent halogen atoms, such as fluorine, chlorine or bromine; alkyl, aryl, aralkyl or cyclohexyl, alkyl and aryl having, for example, the meanings given above. The aryl residue may be substituted in various ways, for example, by the alkyl residues or halogen atoms mentioned above.

In addition to the phosphorus amides mentioned above under (1) to (7), there can be successfully used condensed phosphorus amides or thiophosphorus amides, such as pyrophosphoric acid amides, for example, pyrophosphoric acid tetramides of the formula

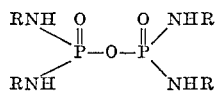

or tris-phosphoric acid amides, such as trisphosphoric acid pentamides of the formula

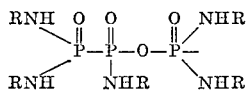

There are also very suitable condensation products of two molecules of phosphoric acid amide or amides, such as condensation products of an amide of the formula

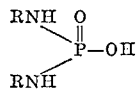

with a glycol, for example, ethylene glycol, such as the condensation product of the formula

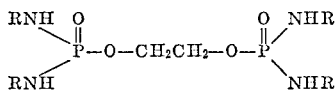

In any of the above compounds the amide group may be partially replaced by ester groups, but in accordance with the foregoing definition at least two nitrogen atoms must have hydrogen atoms bound thereto.

It is to be understood that in any one compound the residues R may be identical with or different from one another.

Furthermore, two or more different phosphorus amides may be used as co-stabilizers in the same stabilizer system, for example, a sulphur-free phosphorus amide may be used together with a thiophosphorus amide.

Especially active are those phosphorus amides which contain aliphatic residues bound to nitrogen, and in the case of sulphur-free compounds the hydrocarbon radicals are advantageously of high molecular weight, for example, octyl, dodecyl or octadecyl residues.

The phosphorus amides used in the invention can be obtained by known general methods such as are described, for example, by E. Michaelis, Liebigs Annalen der Chemie, vol. 326 (1903), pages 129 et seq, and Kosolapoff, "Organo Phosphorus Compounds" (1950), especially pages 278 et seq. In general an acid chloride of phosphorus is reacted with the appropriate amine or amines.

In the case of thiophosphoric acid amides and thiophosphonic acid amides those amides are extremely active which contain hydrocarbon residues of low molecular weight bound to nitrogen, such, for example as thiophosphoric acid tributyl amide.

In the case of moulded pieces that are subjected to normal stresses a proportion of stabilizer and co-stabilizer taken together within the range of 0.001 to 5% by weight, and advantageously 0.05 to 1% by weight, suffices. The ratio of stabilizer to co-stabilizer should range from 5:1 to 1:5 parts by weight, and advantageously 1:1 parts by weight. Thus, for example, polypropylene can be very satisfactorily stabilized by incorporating therewith 0.5% by weight of the condensation product of nonyl-phenol with acetone and 0.5% by weight of phosphoric acid N-methyl-octadecylamidediamide.

The phosphorus amides (co-stabilizers) may be incorporated, for example, together with the alkyl-phenol condensation products, for example, nonyl-phenol condensation products (stabilizers), by first preparing a solution of the stabilizer and the co-stabilizer in an organic solvent, for example, acetone or methylene chloride, and mixing the solution with a small proportion of the pulverulent polyolefin to be stabilised in a proportion such that the mixture, after evaporation of the solvent, contains about 30–40% of stabilizer substance. In this manner there is obtained a dry powder which can be incorporated with the polyolefin by the usual methods.

The stabilizer and co-stabilizer may, of course, be incorporated separately with the polyolefin, and the stabilizer system may be added during the manufacture or working up of the polymerization product.

As polymers to be improved by the aforesaid stabilizer system there may be mentioned substantially olefin polymers, and preferably those which have been made by a low pressure process, for example, by the Ziegler process described in Belgian specifications Nos. 533,362, 534,792 and 534,888.

The stabilizer system of this invention is especially advantageous for polypropylene and polybutylene, but polyethylene also exhibits a marked improvement when treated with the stabilizer system. The stabilizing action is also attained with co-polymers of olefins or mixtures of polyolefins.

An important advantage of the stabilizer system of this invention is that polyolefins stabilized therewith are substantially more resistant to degradation than are polyolefins stabilized with other stabilizers. The stabilizer system of this invention is therefore especially suitable for stabilising shaped bodies of polyolefins which are to be subjected to the prolonged action of heat. Thus, the period required for the product to become brittle, which is the period in days after which a pressure moulded sheet 1 millimetre thick breaks when bent, in the case of polypropylene that has been stabilized with 0.5% of the condensation product of nonylphenol with acetone is 4–5 days at a temperature of 140° C., whereas the same polypropylene which contains, in addition to the aforesaid condensation product, 0.5% of phosphoric acid tris-dodecylamide, breaks only after 35 days. The test piece subjected to the aforesaid heat treatment for 35 days exhibited practically no discoloration as a result of that treatment. It will be understood that low pressure homopolymers or low pressure copolymers of olefins, for example, copolymers of ethylene and propylene, can be stabilized by the process of this invention.

The following example serves to illustrate the invention, but it is not intended to limit it thereto:

Separate portions of a polypropylene were each mixed with 1% of a stabilizer system composed of equal parts of a condensation product of nonyl phenol with acetone and one of the following co-stabilizers:

(a) Phosphoric acid tridodecylamide
(b) Phosphoric acid tri-octadecylamide
(c) Phosphoric acid N-methyl-octadecylamide diamide
(d) Phenyl-phosphonic acid dioctadecylamide
(e) Thiophosphoric acid tributylamide
(f) Thiophosphoric acid dibutylamide dianilide.

From the resulting mixtures sheets 1 millimetre thick were produced by compression. The plates were tempered at 140° C. and the periods required for the sheets to become brittle were determined. In the following table are given the results obtained.

| Co-stabilizer: | Period to become brittle, in days |
|---|---|
| None | 4 |
| (a) | 33 |
| (b) | 35 |
| (c) | 40 |
| (d) | 35 |
| (e) | 80 |
| (f) | 83 |

As will be seen from the table extraordinarily good resistance to embrittlement were imparted to the polypropylene by the above stabilizer systems of this invention. The embrittlement periods, are on the average 8–10 times, and in some cases even 20 times, longer than those imparted by the condensation product of nonyl-phenol with acetone alone, which has hitherto proved to be the best stabilizer.

We claim:

1. A mono-olefin polymer stabilized by 0.001 to 5% by weight of a stabilizer system consisting essentially of (1) a condensation product of alkyl-phenol and a member of the group consisting of an aldehyde, a ketone, sulfur chloride, and a mixture of at least two of said members and (2) as a co-stabilizer a phosphorus amide containing at least two nitrogen atoms which are bound directly to a phosphorus atom and each of which has at least one hydrogen atom bound thereto, the ratio of (1) to (2) being 1:5–5:1.

2. The mono-olefin polymer of claim 1, wherein the co-stabilizer is phosphorus acid tridodecyl amide.

3. The mono-olefin polymer of claim 1, wherein the co-stabilizer is phosphorus acid-N-methyloctadecyl amide dianilide.

4. The mono-olefin polymer of claim 1, wherein the co-stabilizer is thio-phosphoric acid tributyl amide.

5. The mono-olefin polymer of claim 1, wherein the co-stabilizer is thio-phosphoric acid dibutyl amide dianilide.

6. The olefin polymer according to claim 1, wherein the co-stabilizer is phosphoric acid N-methyl-octadecyl-amide diamide.

7. A process for the manufacture of a mono-olefin polymer being stabilized against the deteriorating effect of oxygen and ultra violet radiation, which comprises the steps of preparing a stabilizer system by mixing (1) a condensation product of alkyl-phenol and a member of the group consisting of an aldehyde, a ketone, sulfur chloride and a mixture of at least two of said members and (2) as a co-stabilizer a phosphorus amide containing at least two nitrogen atoms which are bound directly to a phosphorus atom and each of which has at least one hydrogen atom bound thereto, the ratio of (1) to (2) being 1:5–5:1, dissolving said stabilizer system in an organic solvent, admixing to said solution of the stabilizer system a polyolefin powder in such an amount that after evaporation of the solvent the polyolefin in that dry stabilizer mixture contains 30 to 40% by weight of the dry stabilizer system, and admixing the said stabilizer mixture to a mono-olefin polymer in such an amount that the ratio of said stabilizer system is in the range of 0.001 to 5% by weight calculated on the entire polyolefin.

8. A mono-olefin polymer stabilized by 0.001 to 5% by weight of a stabilizer system consisting essentially of (1) a condensation product of alkylphenol and acetone and (2) as a co-stabilizer a phosphorus amide containing at least two nitrogen atoms which are bound directly to a phosphorus atom and each of which has at least one hydrogen atom bound thereto, the ratio of (1) to (2) being 1:2–5:1.

9. A process for the manufacture of a mono-olefin polymer being stabilized against the deteriorating effect of oxygen and ultra violet radiation, which comprises the steps of preparing a stabilizer system by mixing (1) a condensation product of alkyl-phenol and acetone and (2) as a co-stabilizer a phosphorus amide containing at least two nitrogen atoms which are bound directly to a phosphorus atom and each of which has at least one hydrogen atom bound thereto the ratio of (1) to (2) being 1:5–5:1, dissolving said stabilizer system in an organic solvent, admixing to said solution of the stabilizer system a polyolefin powder in such an amount that after evaporation of the solvent the polyolefin in that dry stabilizer mixture contains 30 to 40% by weight of the dry stabilizer system, and admixing the said stabilizer mixture to a mono-olefin polymer in such an amount that the ratio of said stabilizer system is in the range of 0.001 to 5% by weight calculated on the entire polyolefin.

References Cited in the file of this patent

UNITED STATES PATENTS

| | | |
|---|---|---|
| 2,511,063 | Ingram | June 13, 1950 |
| 2,587,549 | Trementozzi | Feb. 26, 1952 |
| 2,751,371 | Bill | June 19, 1956 |
| 2,825,706 | Sanders | Mar. 4, 1958 |
| 2,881,147 | Graham | Apr. 7, 1959 |
| 2,968,641 | Roberts et al. | Jan. 17, 1961 |

OTHER REFERENCES

Gould: "Phenolic Resins," Reinhold Publishing Corp., New York, 1959, pages 193–194 relied upon.